United States Patent Office 3,102,894
Patented Sept. 3, 1963

3,102,894
ANTHRAQUINONE DYESTUFFS
Frank Lodge, Manchester, England, assignor to Imperial Chemical Industries Limited, London, England, a corporation of Great Britain
No Drawing. Filed Oct. 3, 1961, Ser. No. 142,530
Claims priority, application Great Britain July 25, 1958
6 Claims. (Cl. 260—374)

This invention relates to new anthraquinone dyestuffs and more particularly it relates to water-soluble anthraquinone dyestuffs which are valuable for the colouration of cellulose textile materials and nitrogen-containing textile materials in reddish-blue shades of extremely good fastness to wet treatments such as washing.

According to the invention there are provided the anthraquinone dyestuffs which, in the acid form, are represented by the formula:

wherein R represents a radical selected from the class consisting of lower alkyl, phenyl, naphthyl, diphenylyl, phenoxyphenyl, chlorophenyl, nitrophenyl, lower alkylphenyl and lower alkoxyphenyl radicals, and A represents a divalent arylene radical selected from the class consisting of phenylene, chlorophenylene, bromophenylene, lower alkylphenylene and lower alkoxyphenylene; the —$SO_2CH_2CH_2OSO_2R$ group being attached to the divalent arylene radical A at one of the meta- and para-positions thereof relative to the —NH— group.

It is however preferred that R represents a lower akyl radical containing at most 4 carbon atoms and above all are preferred the dyestuffs in which R represents a methyl group.

It is also preferred that the —$SO_2CH_2CH_2OSO_2R$ group is attached to the divalent arylene radical A in meta position relative to the —NH— group.

Throughout this specification the terms "lower alkyl" and "lower alkoxy" are used to denote alkyl and alkoxy radicals respectively of low molecular weight, and in particular alkyl and alkoxy radicals containing at most 4 carbon atoms.

As examples of lower alkylphenyl radicals represented by R there may be mentioned ethylphenyl and, above all, methylphenyl(tolyl) radicals. As examples of lower alkoxyphenyl radicals represented by R there may be mentioned ethoxyphenyl and, above all, methoxyphenyl radicals. As examples of lower alkyl phenylene radicals represented by A there may be mentioned ethylphenylene and, above all, methylphenylene radicals. As examples of lower alkoxyphenylene radicals represented by A there may be mentioned ethoxyphenylene and, above all, methoxyphenylene radicals.

The anthraquinone dyestuffs of the invention may be obtained by treating an anthraquinone compound which, in the acid form, is represented by the formula:

wherein A has the meaning stated above and the —$SO_2CH_2CH_2OH$ group is attached to A in meta- or para-position to the —NH— group, with at least one molecular proportion of an organic sulphonic acid halide of the formula: $R.SO_2X$ wherein R has the meaning stated above, and X represents a bromine or preferably a chlorine atom.

The treatment of the anthraquinone compound with the organic sulphonic acid halide is preferably carried out by stirring the reactants together in a tertiary amine, such as pyridine, quinoline, picoline or lutidine, preferably at a temperature between 0° and 25° C. The anthraquinone dyestuff so obtained may then be isolated, in the acid form, by pouring the resulting mixture into an aqueous solution of hydrochloric acid and filtering off the solid which is precipitated. The anthraquinone dyestuff so obtained may then be converted to a water-soluble salt by dissolving it in an aqueous solution of an alkali, such as ammonium hydroxide, sodium hydroxide, sodium carbonate or potassium carbonate, and adding an inorganic salt such as sodium chloride or potassium chloride to precipitate the so-formed salt.

The anthraquinone compounds used to obtain the anthraquinone dyestuffs of the invention may be obtained as described in United States Patent No. 1,935,929.

As examples of organic sulphonic acid halides which may be used to obtain the anthraquinone dyestuffs of the invention there may be mentioned benzene sulphonyl chloride, 1-naphthylsulphonylchloride, 2-naphthylsulphonylchloride, o-, m- or p-toluenesulphonylchloride, o- or p-methoxybenzene sulphonylchloride, m-nitrobenzenesulphonylchloride, o- or p-chlorobenzene sulphonyl chloride, diphenylether-4-sulphonyl chloride, diphenyl-4-sulphonyl chloride, butane-α-sulphonyl chloride, butane-β-sulphonyl chloride, propane-α-sulphonyl chloride, propane-β-sulphonyl chloride, ethane sulphonyl chloride and, preferably methane sulphonyl chloride.

The anthraquinone dyestuffs of the invention give valuable reddish-blue shades when applied to textile materials such as cellulose textile materials or nitrogen-containing textile materials. The anthraquinone dyestuffs are preferably applied to cellulose textile materials in conjunction with a treatment with an acid-binding agent, such as sodium carbonate, which may be applied to the cellulose textile material before, during or after the application of the said dyestuffs. The anthraquinone dyestuffs are preferably applied to nitrogen-containing textile materials from a neutral or weakly acid dyebath.

When applied to textile materials the said anthraquinone dyestuffs yield reddish-blue shades which possess very good fastness to light and to wet treatments such as washing.

The invention is illustrated but not limited by the following examples in which parts are by weight:

Example 1

10 parts of 1-amino-4-(3′-beta-hydroxyethylsulphonylanilino)anthraquinone-2-sulphonic acid and 100 parts of dry pyridine are stirred at a temperature of 0° C. and 4.6 parts of methane sulphonyl chloride are added during 30 minutes. The mixture is stirred for 1 hour then drowned into ice and water. The mixture is made strongly acid by addition of hydrochloric acid and the material which separates is collected and redissolved in warm water by the addition of sodium carbonate. Potassium chloride is then added and the material which separates is collected on a filter, washed with dilute potassium chloride solution and dried at room temperature. The blue powder thus obtained dissolves in concentrated sulphuric acid to give a pure blue solution and in warm water to give a clear reddish blue solution. It dyes wool from a neutral or weakly acid solution in bright reddish-blue shades which are fast to washing and milling.

Cellulose fibres such as cotton or viscose may be padded or printed with solutions of the dyestuff in the presence of alkaline agents such as sodium carbonate and then subjected to heat treatments to give reddish-blue colourations with very good fastness to wet treatments and to light.

The dyestuffff of this example has the structural formula:

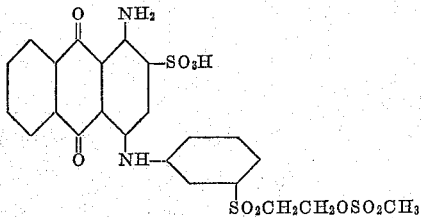

*Example 2*

10 parts of 1-amino-4-(3'-beta-hydroxyethylsulphonylanilino)anthraquinone-2-sulphonic acid and 100 parts of dry pyridine are stirred at 0° C. and 7.6 parts of benzene sulphonyl chloride are added during 30 minutes. The mixture is then stirred at 0° C. for 4 hours, drowned into 1200 parts of water and acidified by adding hydrochloric acid in excess. The tarry product which separates is allowed to stand and cool overnight. The product is filtered off, washed with dilute hydrochloric acid. The solid cake is stirred into 1000 parts of cold water and sufficient sodium carbonate is added to make the blue solution just alkaline. The dyestuff is precipitated by adding 50 parts of sodium chloride and is filtered off and washed with 5% sodium chloride solution. It is dried at room temperature. The blue powder gives a clear reddish-blue solution from which wool may be dyed from a neutral or weakly acid bath in bright, fast to washing blue shades. Cellulosic fibres such as cotton or viscose may be padded or printed with solutions of the dyestuff in the presence of alkaline agents such as sodium carbonate and then subjected to heat treatments to give reddish-blue colourations with very good fastness to wet treatments and to light.

The dyestuff of this example has the structural formula:

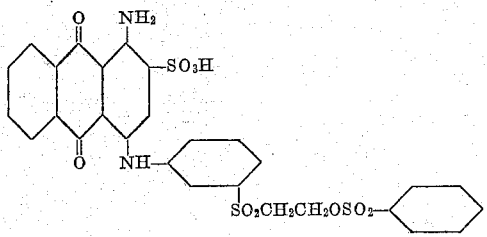

*Example 3*

If the benzene sulphonyl chloride used in Example 2 is replaced by 9 parts of naphthalene β-sulphonyl chloride a similar product is obtained.

The dyestuff of this example has the structural formula:

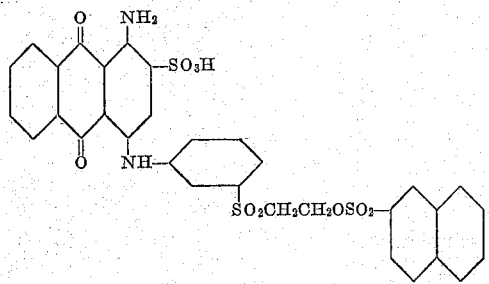

*Example 4*

47.5 parts of 1-amino-4-(2'-methoxy-5'-beta-hydroxyethylsulphonylanilino)anthraquinone - 2 - sulphonic acid and 475 parts of pyridine are stirred at 0° C. and 22 parts of methane sulphonyl chloride are added dropwise at 0° C. during 30 minutes. The blue solution is then stirred at 0° C. for one hour.

The pyridine mixture is poured into approximately 5000 parts of ice and water and carefully acidified with hydrochloric acid. The suspended product is filtered off, washed with 3% hydrochloric acid and the filtercake is stirred with 2000 parts of water. Enough sodium carbonate is added to make the mixture just alkaline. The separation of the dyestuff is completed by adding salt, filtering off, washing with 3% sodium chloride solution and drying at room temperature in vacuum. The product dissolves in hot water to a bright blue solution which dyes wool from a neutral bath in fast blue shades.

The dyestuff of this example has the structural formula:

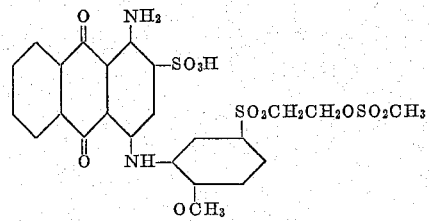

The following table gives further examples of anthraquinone dyestuffs of the invention which are obtained when the anthraquinone compounds listed in the second column of the table are reacted with the sulphonchlorides listed in the third column of the table by the methods described in any of the previous examples:

| Example | Anthraquinone compound | Sulphonchloride |
|---|---|---|
| 5 | 1-amino-4-(3'-β-hydroxyethylsulphonylanilino)-anthraquinone-2-sulphonic acid. | ethane sulphonyl chloride. |
| 6 | do | p-toluene sulphonyl chloride. |
| 7 | do | m-butane sulphonyl chloride. |
| 8 | do | m-nitrobenzene sulphonyl chloride. |
| 9 | do | p-chlorobenzene sulphonyl chloride. |
| 10 | do | p-methoxybenzene sulphonyl chloride. |
| 11 | 1-amino-4-(2'-methyl-5'-β-hydroxyethylsulphonylanilino) anthraquinone-2 sulphonic acid. | methane sulphonyl chloride. |
| 12 | 1-amino-4-(2'-chloro-5'-β-hydroxyethylsulphonylanilino) anthraquinone-2-sulphonic acid. | Do. |

This application is a continuation-in-part of application Serial No. 826,464, which was filed in the United States Patent Office on July 13, 1959, and is now abandoned.

What I claim is:

1. The anthraquinone dyestuff which, in the acid form, are represented by the formula:

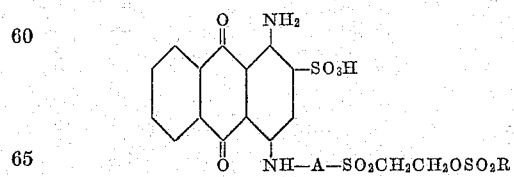

wherein R represents a member selected from the class consisting of lower alkyl, phenyl, naphthyl, diphenylyl, phenoxyphenyl, chlorophenyl, nitrophenyl, lower alkyl phenyl and lower alkoxy phenyl, and A represents a divalent arylene radical selected from the class consisting of phenylene, 2-chlorophenylene, 2-loweralkylphenylene and 2-loweralkoxyphenylene, the —SO₂CH₂CH₂OSO₂R group being attached at the 5-position of the divalent arylene radical A, relative to the —NH— group.

2. The anthraquinone dyestuff of the formula:
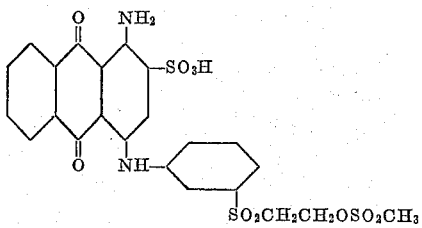
3. The anthraquinone dyestuff of the formula:
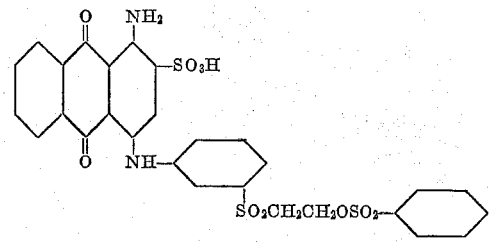
4. The anthraquinone dyestuff of the formula:
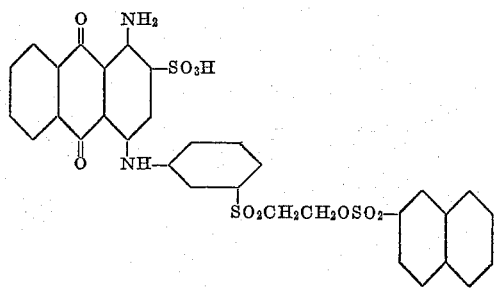
5. The anthraquinone dyestuff of the formula:
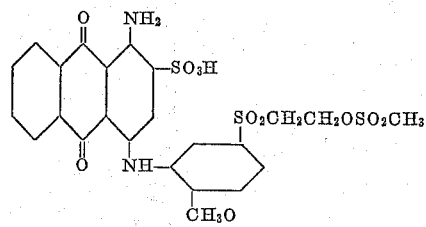
6. The antraquinone dyestuff of the formula:
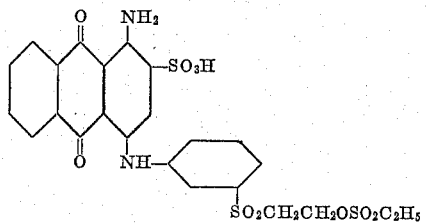
References Cited in the file of this patent
UNITED STATES PATENTS
| | | |
|---|---|---|
| 1,935,929 | Zahn et al. | Nov. 21, 1933 |
| 2,657,205 | Heyna et al. | Oct. 27, 1953 |
FOREIGN PATENTS
| | | |
|---|---|---|
| 779,781 | Great Britain | July 24, 1957 |
| 1,022,099 | Germany | Feb. 7, 1957 |